Aug. 28, 1956   G. A. LYON   2,760,828
WHEEL COVER
Filed March 3, 1953
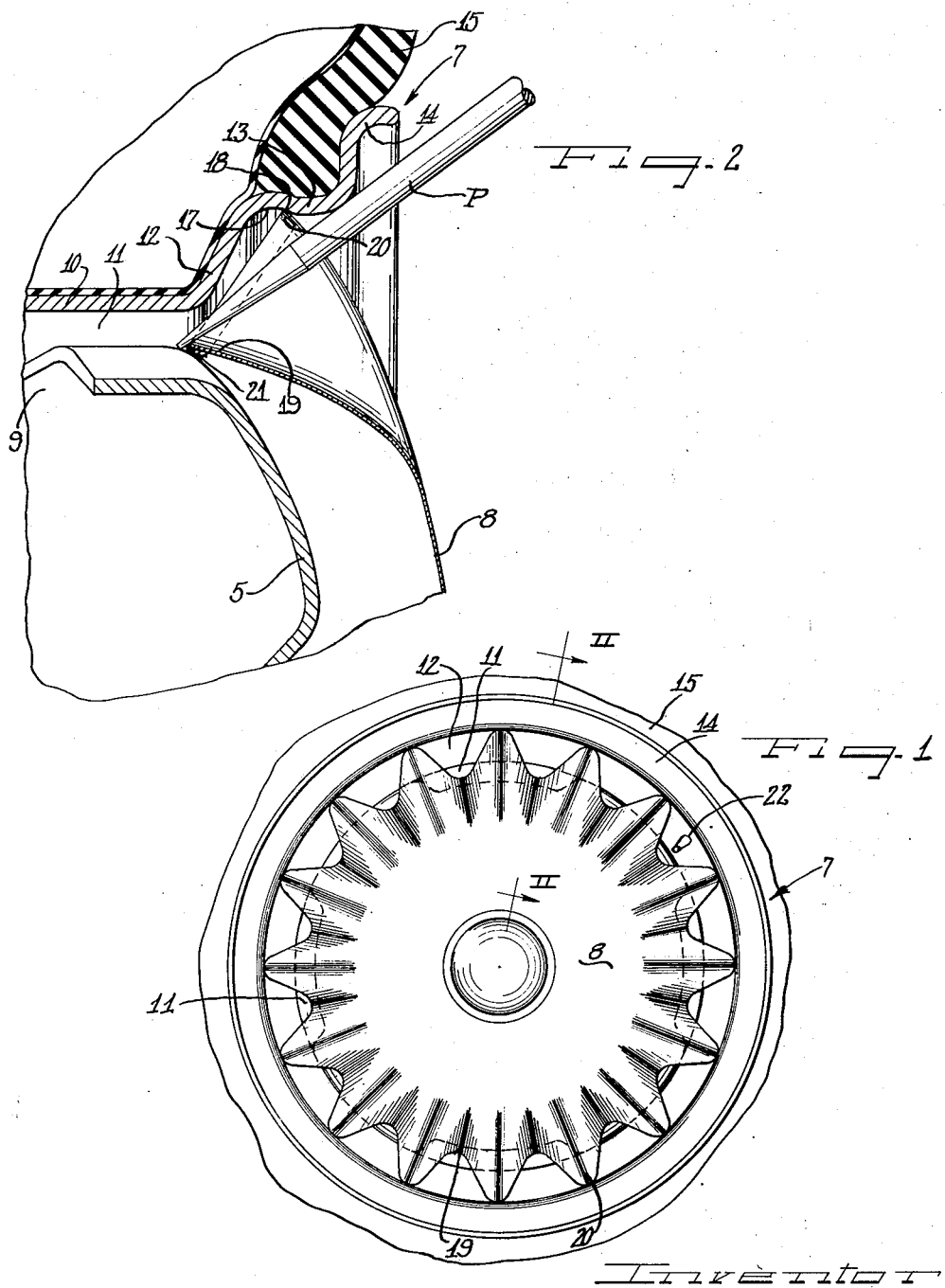
Inventor
George Albert Lyon
By Hill, Sherman, Meroni, Gross & Simpson
Attys United States Patent Office 2,760,828
Patented Aug. 28, 1956

2,760,828

WHEEL COVER

George Albert Lyon, Detroit, Mich.

Application March 3, 1953, Serial No. 339,975

6 Claims. (Cl. 301—37)

The present invention relates to improvements in wheel structures and most particularly concerns the ornamental and protective covering of outer sides of vehicle wheels.

An important object of the present invention is to provide an improved wheel structure having on the outer side thereof a cover which is self-retaining in association with a part of the wheel.

Another object of the invention is to provide a wheel structure having thereon a wheel cover with the margin constructed to facilitate circulation of air through the wheel.

A further object of the invention is to provide in a disk spider type of wheel structure a cover for generally simulating a spoke arrangement.

Yet another object of the invention is to provide an improved wheel cover for disposition at the outer side of the vehicle wheel.

It is another object of the invention to provide a wheel cover for the outer side of vehicle wheels and having a marginal formation providing retaining means and air circulation passages.

Other objects, features and advantages of the invention will be readily apparent from the following detailed description of a preferred embodiment thereof taken in conjunction with the accompanying drawing in which:

Figure 1 is a side elevational view of a wheel structure embodying features of the invention; and Figure 2 is a fragmentary radial sectional view taken substantially on the line II—II of Figure 1.

By the present invention, a wheel comprising a disk spider body 5 and a tire rim 7 carried thereby is provided with a wheel cover 8 which is peripherally engageable with the tire rim in snap-on pry-off relation and affords for the outer side of the wheel the general appearance of a spoke wheel.

At its outer margin, the wheel body 5 has a generally axially inwardly extending flange 9 by which it is attached to a base flange 10 of the tire rim, there being at suitable intervals such as three to five, but four being shown herein, inset portions in the flange 9 to provide wheel openings 11 through which air is adapted to circulate in the operation of the wheel. From the base flange 10 of the tire rim extends a generally radially outwardly directed side flange 12 merging with a generally axially outwardly directed intermediate flange 13 which in turn merges with a terminal flange 14. The flanges of the tire rim are constructed and related to support a pneumatic tire and tube assembly 15.

According to the present invention, the wheel cover 8 is constructed of a single piece of suitable thin gauge sheet metal such as stainless steel or brass and the outer side of the cover may be polished or plated or otherwise suitably finished. The diameter of the wheel cover 8 is such as to completely cover the wheel body 5 and substantially the side flange 12 of the tire rim and the peripheral extremity of the cover is constructed to engage in snap-on pry-off relation with the intermediate flange 13 of the tire rim. To this end, the intermediate flange 13 has an annular radially inwardly opening groove 17 therein, as for example at the juncture of the intermediate flange with the side flange as is found in wheels having what is known as a safety rim. At the axially outer side of the groove 17 it is defined by a generally axially and radially inwardly facing sloping shoulder 18.

The cover 8 is of crowned, generally outwardly convex shape with the edge extremity thereof dimensions slightly greater than the diameter of the larger diameter portion of the groove 17. At uniformly spaced intervals, the margin of the cover is inset to provide gusset-like formations or indentations 19 alternating with symmetrical generally radially extending rib-like marginal spoke projections 20. The arrangement and relationship of the alternating depressions 19 and projections 20 is substantially like corrugations or like a symmetrically scalloped edge. In order to increase the resiliency of the corrugated or scalloped edge of the cover, it is provided with a double thickness edge by virtue of an underturned continuous marginal reinforcing flange 21.

For retaining the cover on the wheel, the marginal projections 20 afford at their axially outer side respective generally axially and radially outwardly facing retaining shoulders engageable resiliently in snap-on- pry-off relation in the groove 17 of the tire rim behind the shoulder 18. This retaining relationship of the projections 20 is substantially facilitated by the peripherally as well as radially rounded shape of the projections. The retaining resiliency of the projections is substantially enhanced by the continuous connection and thereby mutual resistance to deformation of the several projections through the inset marginal portions 19 serving as inwardly bowed spring backings for the radially outwardly thrusting retaining projections 20. Thereby, under the radially inward compression to which the retaining projections 20 are subjected as an incident to engagement with the shoulder 18 on the tire rim, the inherent resiliency of the projections 20 as backed up by the spring pressure of the indented portions 19 creates a substantial radially outward thrust uniformly about the perimeter of the cover for retaining the cover in assembled relation with the tire rim shoulder 18 and thereby with the wheel.

Enhancement of the shoulder engaging thrust of the retaining projections 20 may be effected by engagement of the innermost tips of the spring insets 19 against the wheel body 5 adjacent to but spaced radially inwardly from the juncture of the wheel body and the tire rim.

In the application of the cover 8 to the outer side of the wheel, one of the marginal indentations is oriented relative to a valve stem 22 projecting through the side flange 12 of the tire rim, and the cover is then pressed generally axially inwardly to cam the peripheral retaining projections 20 into engagement with the intermediate flange 13 and until the projections have snapped into retaining relation behind the shoulder 18, the resilience of the projections 20 and the resilient gusset-like deflectability of the indented portions 19 enabling resilient deflectable contraction of the projections 20 to pass the radially inwardly projecting axially outward portion of the intermediate flange 13 until the projections 20 snap into the groove 17.

By preference, the marginal scallops or indentations 19 are of sufficient depth to at least partially clear radially inwardly beyond the tire rim base flange 10 at the wheel openings 11. As a result, free air circulation through the wheel openings 11 and through the passages provided by the adjacent marginal indentations in the cover is provided for.

For prying the cover free from the wheel, a pry-off tool P such as a screw driver may be inserted behind one of the indented portions 19 of the cover margin at one of the wheel openings 11 and pry-off leverage applied by the tool fulcruming on the tire rim. As best evidenced in Figure 2, this causes not only an axially outward but also a radially inward component of pry-off force effecting slight radially inward deflection of the adjacent marginal portion of the cover and thus drawing generally radially inwardly the two adjacent retaining projections 20 as the axially outward pry-off force forces the cover axially outward. Due to the inherent resilience of the several retaining projections and the intermediate indented portions 19, additional pry-off leverage may have to be applied to an indented portion 19 at an adjacent wheel opening 11, after removal of the cover has been started at one of the wheel openings 11. After the cover has been started off of the wheel, pry-off leverage may be applied at a number of successive points until the cover has been tilted sufficiently to pop off of the wheel.

It will be understood that modifications and variations may be effected without departing from the scope of the novel concepts of the present invention.

I claim as my invention:

1. In a wheel structure including a multi-flange tire rim and a wheel body, a cover for disposition at the outer side of the wheel comprising a resilient sheet metal member having an indented periphery providing alternate generally radially outwardly directed projections and generally radially inwardly indented portions, said projections being retainingly engageable with the tire rim for retaining the cover on the wheel, said indented portions engaging the wheel body and effecting radially outward thrusting pressure to said projections.

2. In a wheel structure including a generally radially facing annular portion and a generally axially facing portion inset relative to said radially facing portion and radially spaced therefrom, a cover for disposition at the outer side of the wheel comprising a resilient cover body having a generally scallop-like marginal formation including generally radially extending spoke rib projections retainingly engageable resiliently with said radially facing portion, and resilient gusset-like indentations for bottoming against said axially facing portion to afford axially inward stops for the cover.

3. In a wheel structure including a generally radially facing annular portion and a generally axially facing portion inset relative to said radially facing portion and radially spaced therefrom, a cover for disposition at the outer side of the wheel comprising a resilient cover body having a generally scallop-like marginal formation including generally radially extending spoke rib projections retainingly engageable resiliently with said radially facing portion, and resilient gusset-like indentations for bottoming against said axially facing portion to afford axially inward stops for the cover, the marginal extremity of the cover including said projections and said indentations being underturned continuously to provide a resiliency improving reenforcing flange.

4. In a wheel structure including a wheel body and a multi-flange tire rim having a generally axially facing inner flange and a generally radially inwardly facing flange outwardly therefrom, a cover for disposition at the outer side of the wheel comprising a resilient sheet metal disk provided at its margin with generally radially extending spoke-like rib projections directed generally radially outwardly and axially inwardly and thrusting resiliently in retaining relation against said radially facing flange, and gusset-like resilient indentations intervening between said projections and directed generally radially outwardly and axially inwardly spaced radially inwardly from the extremities of the projections and engaging as stops against the wheel, said indentations affording points of engagement between the projections for a pry-off tool adapted to be levered against the tire rim for exerting radially inward and axially outward pry-off pressure against the cover margin to deflect the engaged gusset and the adjacent projections resiliently generally radially inwardly and force the projections axially outwardly for disengagement from the tire rim.

5. In a wheel structure including a tire rim and a wheel body with openings through the wheel adjacent juncture of the body and rim, a cover for disposition at the outer side of the wheel including a portion for overlying the wheel body and having a radially outer marginal portion for overlying the tire rim, said outer marginal portion having a uniformly circumferentially spaced series of generally radially outwardly and axially sloping cover retaining ribs having ends that engage retainingly under tension with a radially inwardly facing flange of the tire rim, and with generally radially elongated gusset-like open fold formations between the ribs merging with the inner wheel body covering portion of the cover across the juncture of the wheel body and tire rim and said openings, certain of said gusset-like formations coacting generally funnel-like with the wheel openings for air circulation through the openings and said certain gusset-like formations at the periphery of the cover and past the tire rim.

6. In a wheel structure including circular generally radially facing and axially facing portions with the axially facing portion disposed axially inwardly relative to the radially facing portion, a cover for disposition at the outer side of the wheel including a cover body having a generally circular resilient marginal portion of generally scallop-like undulating rib formation with first ribs extending generally radially and providing cover retaining tips engageable under resilient radially thrusting relation against the radially facing annular wheel portion and with second ribs between the first ribs extending generally radially across said axially facing wheel portion and having portions thereof engageable against said axially facing wheel portion as an axial stop for the cover and cooperating to maintain said tips in resilient cover retaining thrusting relation against said radially facing wheel portion.

References Cited in the file of this patent

UNITED STATES PATENTS

| | | |
|---|---|---|
| 2,135,758 | Lyon | Nov. 8, 1938 |
| 2,199,889 | Lyon | May 7, 1940 |
| 2,308,617 | Lyon | Jan. 19, 1943 |
| 2,308,618 | Lyons | Jan. 19, 1943 |
| 2,633,944 | Butterfield | Apr. 7, 1953 |
| 2,639,948 | Grimshaw | May 26, 1953 |